May 2, 1961  A. M. SPOUND  2,982,340
RECLINING CHAIR HEADREST CONSTRUCTIONS
Filed Sept. 30, 1959  2 Sheets-Sheet 2
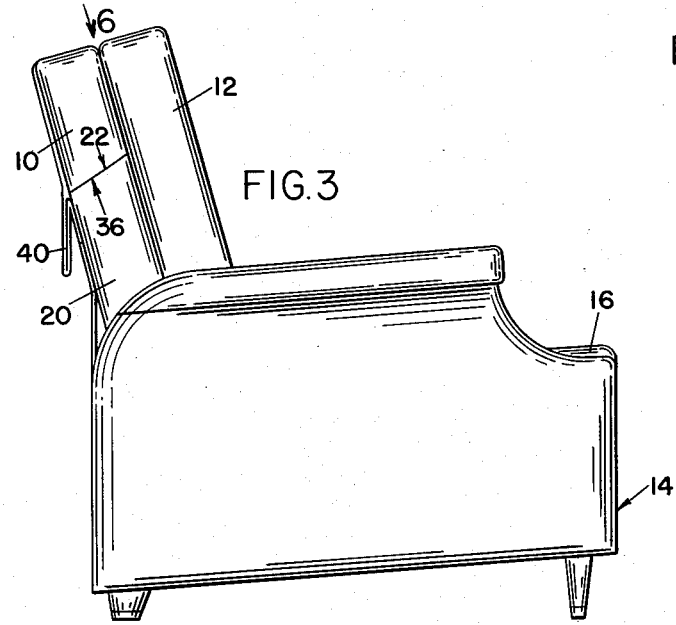
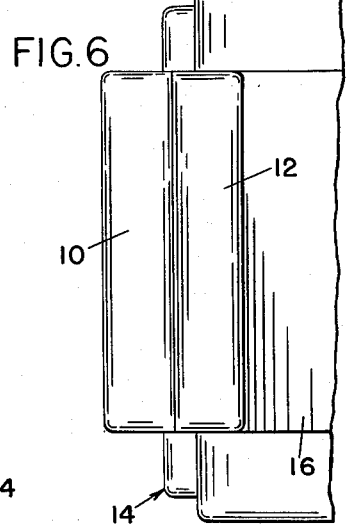
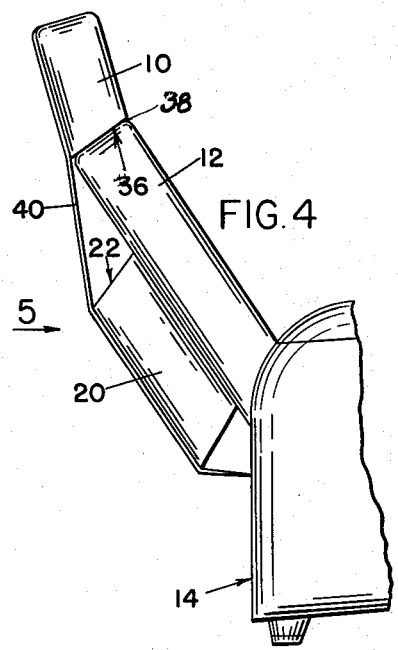
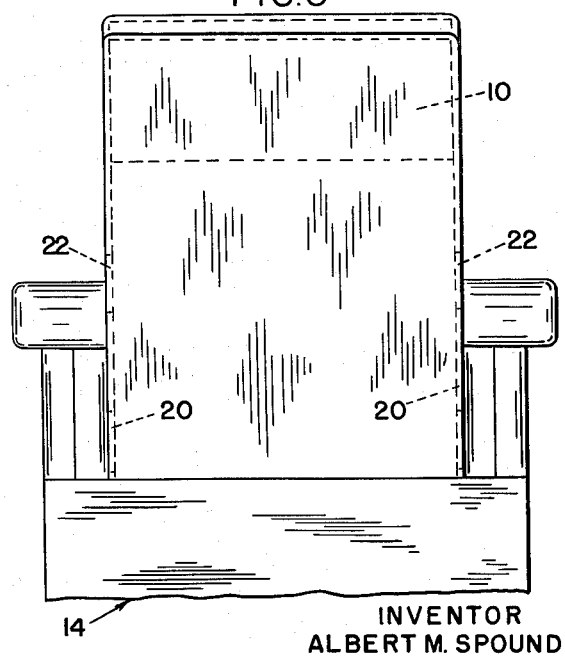
INVENTOR
ALBERT M. SPOUND
ATTORNEY

United States Patent Office 2,982,340
Patented May 2, 1961

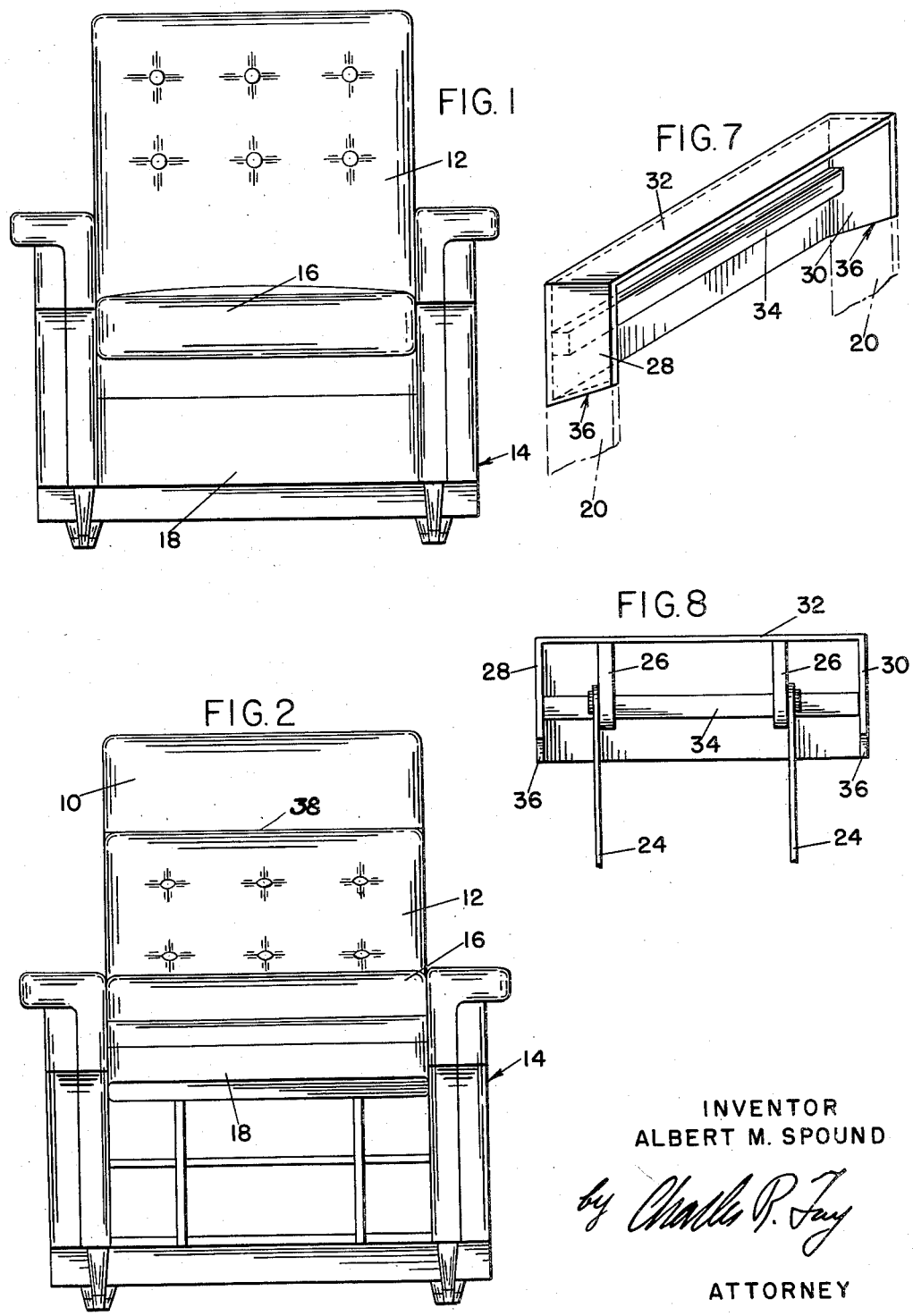

2,982,340

RECLINING CHAIR HEADREST CONSTRUCTIONS

Albert M. Spound, Wellesley Hills, Mass.
(% Charlton Co., Fitchburg, Mass.)

Filed Sept. 30, 1959, Ser. No. 843,442

10 Claims. (Cl. 155—177)

This invention relates to an improvement on the invention disclosed in United States Patent #2,884,992, issued May 5, 1959.

The principal object of the present invention resides in the provision of an improved headrest construction in which the headrest itself extends completely across the width of the backrest which provides that when the headrest is in its "down" or inoperative position, it is substantially invisible from the front, sides or back of the chair, and appears to be an integral part of the chair construction which has the usual low back.

A further object of the invention resides in the provision of an improved headrest which is made in such a way that the entire backrest is virtually divided into two parts, one part of which is the backrest proper; at the top portion thereof it is split transversely from the top downwardly a relatively short portion of the height thereof and the split portion defines the headrest itself which includes the mechanism defined in the above-identified patent for being automatically raised and lowered as the backrest tilts forward and back, to the end that the headrest itself is substantially concealed from all sides of the chair when the headrest is in its down out-of-the-way position.

A still further object of the invention resides in the provision of a full-width headrest mounted in relation to the reclining backrest, said full-width headrest presenting when in its "up," forward and useful position, an exact continuation of the backrest itself, being the full width thereof, so that the comfort and appearance of the headrest is greatly improved over that of the patented construction referred to above.

Other objects and advantages of the invention will appear hereinafter.

Reference is to be had to the accompanying drawings, in which

Fig. 1 is a front view of the chair with the headrest in closed position and hence not visible;

Fig. 2 is a front view of the chair showing the headrest in extended position;

Fig. 3 is a side elevation of Fig. 1;

Fig. 4 is a side elevation of Fig. 2, parts being broken away;

Fig. 5 is a rear elevation showing the chair in fully-extended condition;

Fig. 6 is a plan view, looking in the direction of arrow 6 in Fig. 3, parts being broken away;

Fig. 7 is a perspective view showing some details of the new headrest frame; and Fig. 8 is a front view of the headrest frame.

In carrying out the present invention, it is to be observed that a mechanism similar to that described fully in the above-identified patent is used for projecting headrest 10 from its closed position as shown in Fig. 1 where it is not used, to the full projected position thereof as shown in Figs. 2, 4 and 5, and it is therefore believed that a detailed disclosure of this mechanism is not necessary. As a matter of fact, any kind of mechanism which will accomplish this purpose may be utilized, and it is pointed out that the path of the headrest as it projects from its concealed position, Fig. 1, to its fully extended position, Figs. 2, 4 and 5, is upwardly and forwardly as fully disclosed in the above-identified patent. It is also, however, to be observed that when the headrest is in its fully up, forward, useful position, it is aligned with and in contact with the backrest 12 at the top thereof and the headrest forms a continuation of the backrest for extra comfort and improved appearance.

As usual, the chair comprises a framework generally indicated at 14. This framework may of course be of any construction and may include arms of any kind or the arms may be omitted if desired. There is a seat 16 and if desired the conventional projected footrest portion 18 which operates in a manner well known to those skilled in the art, coming up to the position shown in Fig. 2, when the reclining chair is in its rearwardmost position.

In the illustration of this case, the backrest 12 and seat 16 are shown as being fixed together, but this is not necessary and as is well known, any kind of reclining backrest may be utilized as long as it is swingably mounted in some way on frame 14, so that when it moves back, it will energize a linkage to project the headrest as described in the above patent aforesaid.

The backrest 12 preferably comprises a spring unit or cushion which may be of general well known construction and at its rear surface, at the side edges thereof, it is provided with a pair of rearwardly-extending, wing-like members 20, 20 which are of course upholstered and are fixed in position relative to the backrest 12. These members 20 are provided with a relatively inclined top edge surface which is particularly apparent at 22 in Fig. 4 and these wing-like members 20, 20 are of course moved with the backrest being in fixed relationship thereto.

The linkage for actuating the headrest is located between the wing-like members 20, 20 and it is also to be observed that this linkage is completely concealed as will be explained more fully hereinafter. The headrest 10 is supported and moved on a pair of parallel bar linkage mechanism as described in the above-identified patent and is supported thereon when extended as in Fig. 4. However, as shown in Fig. 1, the headrest rests on the edges 22 of the rearwardly extending wing-like members 20 when in the downwardly inoperative concealed position.

This headrest comprises a framework shown in Figs. 7 and 8 wherein the parallel bar linkages referred to are generally indicated by the reference numerals 24. These are pivotally connected to frame members 26, 26 of the headrest which are in turn connected to a generally U-shaped frame member comprising end members 28 and 30, these being connected by the top longitudinal member 32 which extends across the headrest from side-to-side thereof. A cushion member is made to overlie the frame members 26 and the links as well as a brace member 34 which may be utilized if desired, and this cushion member will form the continuation of backrest 12 as shown in Figs. 2 and 4. The rear edges of the side members 28 and 30 are inclined to closely fit edges 22 on the rearwardly-extending wing-like members 20, when the headrest is down, see reference numeral 36 in Figs. 1, 4 and 7.

All of the front, rear, and top members of the headrest are covered by upholstery material which of course is preferably the same as that covering the backrest 12, and when the headrest is in its uppermost position, see Figs. 2 and 4, it will actually appear to be a part of the backrest inasmuch as it extremely snugly fits at the parting line 38.

Also at the same time the backrest 10 appears to be an integral part of backrest 12 when the same is down in its non-useful concealed condition as in Figs. 3 and 6, and it will be seen therefore that this invention provides a much better appearing and more comfortable headrest for a chair, extending the complete width from side-to-side of the backrest so that the occupant may relax in the chair with his head at any point on the backrest rather than merely in the central portion thereof as heretofore.

In order to conceal the linkage mechanism, a loose fabric member 40 may be utilized and this is connected to the rear edge of the headrest 10 so that when the headrest is in the extended condition, this piece of fabric is stretched, but when the headrest is in its downward position, this piece of fabric will fold neatly so as to conceal the fact that there are any movable parts involved in the chair other than of course the reclining back, etc.

Having thus described my invention and the advantages thereof, I do not wish to be limited to the details herein disclosed, otherwise than as set forth in the claims, but what I claim is:

1. A reclining chair comprising a frame, a seat and a backrest, said backrest being swingably mounted on said frame, a headrest mounted on said backrest, said headrest being movable between operative and inoperative positions, means at the rear side surface of said backrest at an intermediate portion thereof forming a recess, said means extending rearwardly and terminating below the top edge of the backrest, so that the recess is open upwardly and rearwardly, said headrest being mounted to lie within an area defined by said rearwardly-extending means and the rear surface of said backrest and extending upwardly from said rearwardly-extending means to alignment with the top edge of the backrest so that when in contact with said rearwardly-extending means the headrest is in close proximity to and is visible but appears as an integral part of the backrest, and means for moving said headrest upwardly out of said recess and forwardly into a position in general alignment with the front surface of said backrest and in close proximity thereto, the lower edge of said headrest being restrained to closely engage the top edge of the backrest so that the headrest in this position also appears as an integral part of the backrest, the headrest extending substantially the full width of the backrest.

2. The reclining chair of claim 1 wherein said backrest and headrest are of equal width.

3. A reclining chair of the class described comprising a frame, a seat and a movable backrest mounted on the seat, said backrest being essentially composed of two separate parts, one of which is movable relative to the other, means to move the movable portion of said backrest relative thereto, said movable portion of said backrest comprising a headrest which is movable from an inoperative position at the rear of said backrest proper to a position thereabove and in close association therewith, said backrest including at the two side edges thereof rearwardly extending panel-like means rigidly fixed thereto, and said headrest including side members which are aligned in co-planar relationship with said rearwardly-extending panel like members and which when in contact therewith appear to be in extension thereof and of the backrest.

4. The reclining chair construction as set forth in claim 3 including a flexible cover member attached to the rear surface of said headrest at the lower edge thereof and following the same in the motion thereof to conceal the back portion of said frame and backrest.

5. A reclining chair including a frame, a seat, and a backrest, said backrest being swingably mounted on said frame, rearwardly-extending means at each side edge of said backrest, said means including panel-like members terminating short of the top edge of the backrest, and a headrest, said headrest including a frame, said frame comprising side panel-like members and a top cross member connecting the panel-like members, said panel-like members contacting the top edges of the rearwardly-extending panel-like members at the back surface of the backrest in one position of the headrest, and means to move the headrest from said one position to a position above the backrest in contact therewith wherein the forward surface of said headrest forms a continuation of the forward surface of the backrest, said headrest and backrest being generally of the same width.

6. A reclining chair construction as set forth in claim 5 wherein the rearwardly-extending panel-like members on the backrest and the side edge panel members of the headrest contact each other in inoperative position of the headrest, and the top edges of the rearwardly-extending panel-like members and the bottom edges of the headrest being located on similar inclined lines relative to the horizontal, said edges on the side panel-like members of the headrest generally contacting the top edge surface of the backrest when disposed above the same in operative condition of the headrest, and appearing as an extension of the side surfaces of the backrest, the panel-like members on the backrest and headrest contacting and appearing as single continuous members when the headrest is in concealed inoperative condition as the rear of the backrest.

7. A reclining chair of the class described comprising a frame, a seat thereon and a reclining backrest, said backrest being swingably mounted with respect to said frame, said backrest having a recess therein at its rear surface and adjacent the top edge thereof, said recess extending fully from side-to-side of said backrest, a headrest located in said recess, means moving said headrest out of said recess upwardly with respect to said backrest and forwardly over the top edge of the latter to become in general co-extensive therewith, said headrest comprising a generally inverted U-shaped frame member, and cushion means within said frame member, said U-shaped frame member including relatively short free-ended legs and a connecting member, said connecting member forming a portion of the top of the backrest, and said free-ended leg members forming portions of the sides of said backrest when the headrest in within the recess.

8. A reclining chair as set forth in claim 7 wherein said free-ended legs form in general a continuation of the side edges of said backrest when the headrest is above the same, said headrest and backrest being substantially of the same width.

9. In a reclining chair having a frame and a reclining backrest thereon, said backrest having a recess therein at the rear side thereof, said recess extending from side edge to side edge of the backrest, a headrest having a size and shape to just occupy the recess, and being movable from recess occupying position wherein the headrest appears as a part of the backrest, to an exposed position over the backrest and in juxtaposition thereto when the headrest appears as an extension of the backrest, said backrest and headrest being generally of the same width.

10. In a reclining chair having a frame and a reclining backrest thereon, said backrest having a recess therein at the rear side thereof, said recess extending from side edge to side edge of the backrest, a headrest having a size and shape to just occupy the recess with the top edges of the backrest and headrest co-extensive, and being movable from recess occupying position wherein the headrest appears as a part of the backrest, to an exposed position over the backrest and in close juxtaposition thereto wherein the headrest appears as an extension of the backrest, said backrest and headrest being generally of the same width.

References Cited in the file of this patent

UNITED STATES PATENTS

| 612,816 | Brilliant | Oct. 25, 1898 |
| 711,412 | Archambeault | Oct. 14, 1902 |
| 1,755,842 | Schoberl | Apr. 22, 1930 |

FOREIGN PATENTS

| 1,063,769 | France | Dec. 16, 1953 |
| 1,102,296 | France | May 4, 1955 |